E. PAULSON.
HAY AND GRAIN LOADER AND CARRIER.
APPLICATION FILED NOV. 2, 1914.
1,163,033.
Patented Dec. 7, 1915.
3 SHEETS—SHEET 3.
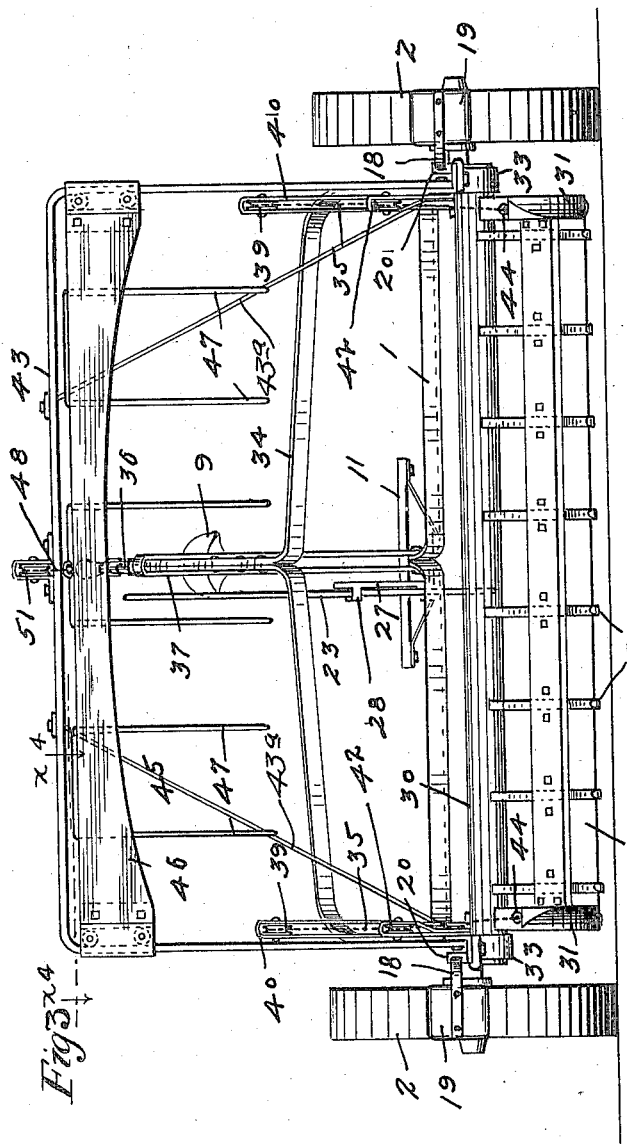
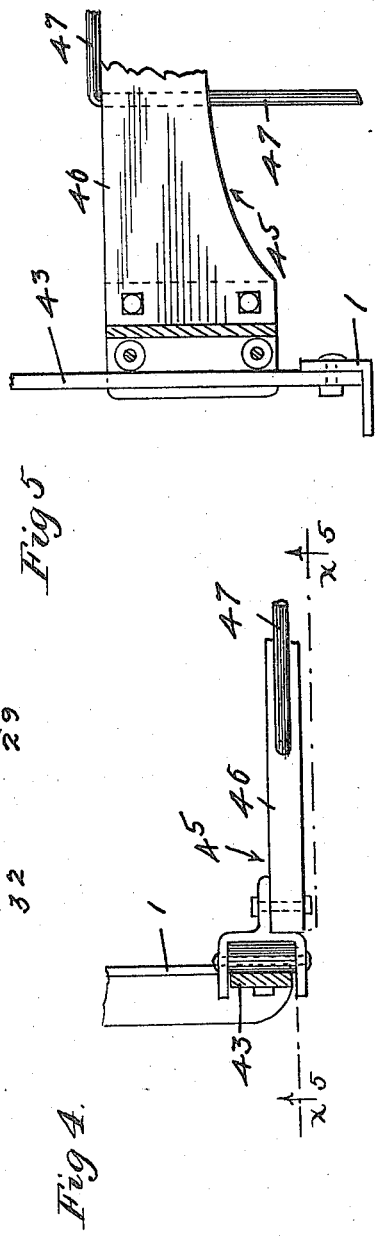
Inventor
Erland Paulson
By his Attorneys

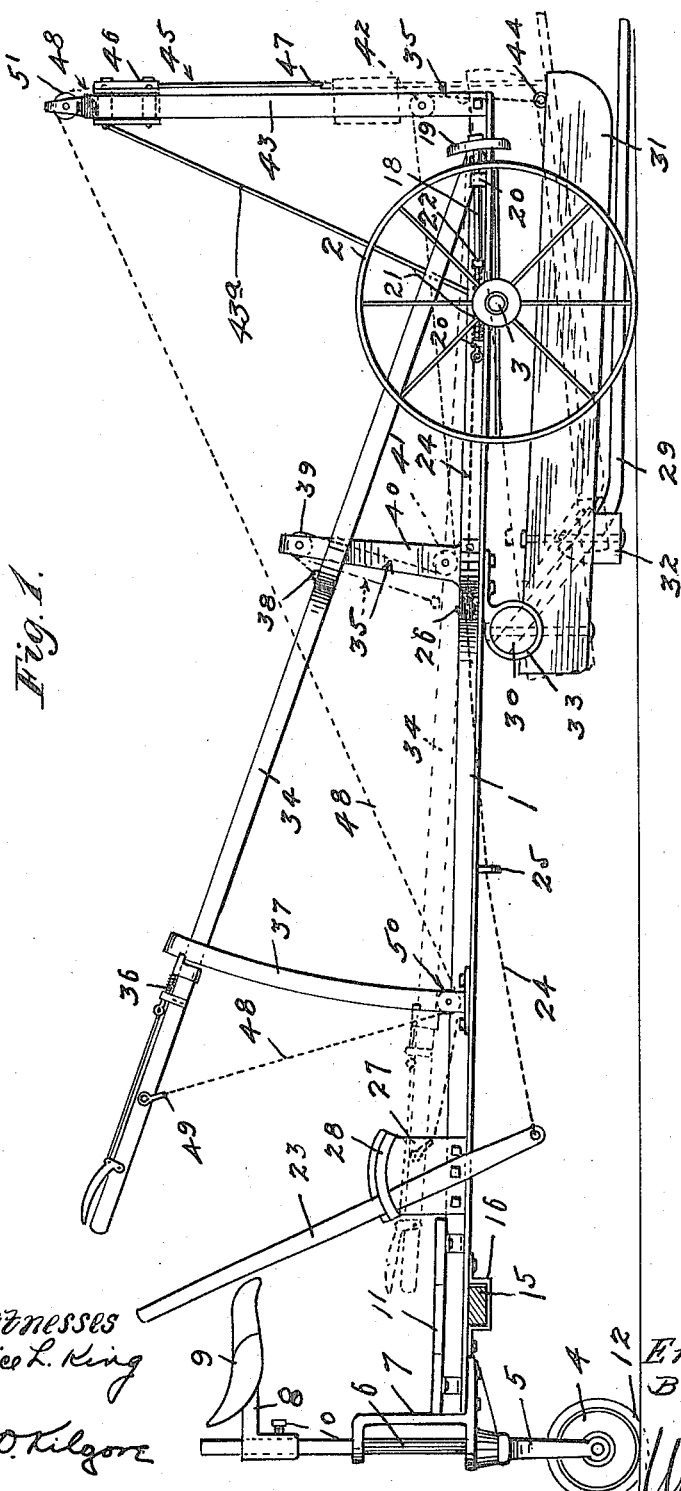

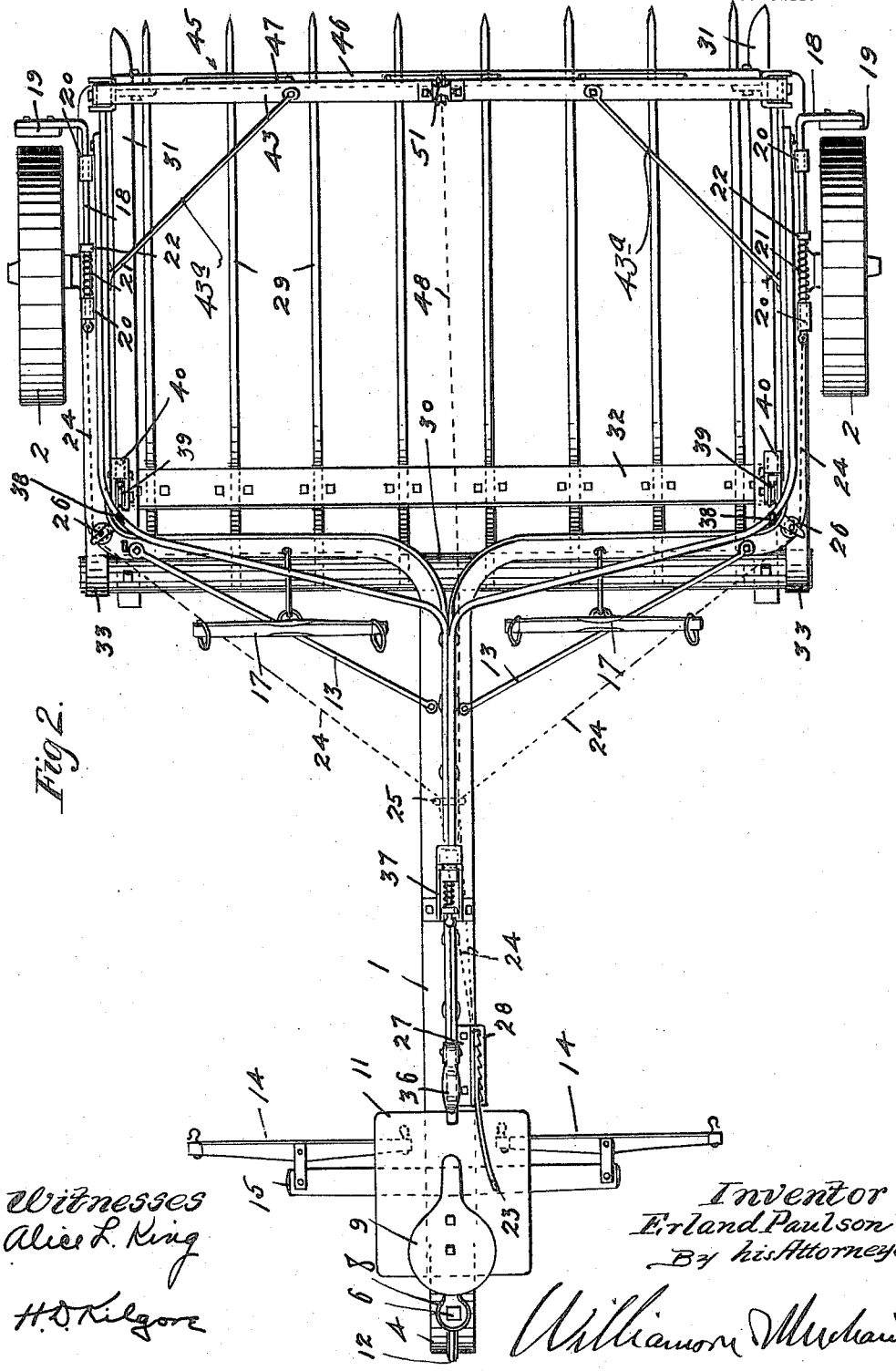

UNITED STATES PATENT OFFICE.

ERLAND PAULSON, OF EMERSON, NORTH DAKOTA.

HAY AND GRAIN LOADER AND CARRIER.

1,163,033.            Specification of Letters Patent.        Patented Dec. 7, 1915.

Application filed November 2, 1914. Serial No. 869,800.

*To all whom it may concern:*

Be it known that I, ERLAND PAULSON, citizen of the United States, residing at Emerson, in the county of Dunn and State of North Dakota, have invented certain new and useful Improvements in Hay and Grain Loaders and Carriers; and I do hereby declare the following to be a full, clear, and exact description of the invention, such as will enable others skilled in the art to which it appertains to make and use the same.

My invention relates to improvements in hay and grain loaders and carriers, of the type generally designated as buckers; and, to this end, it consists of the novel devices and combinations of devices hereinafter described and defined in the claims.

In the accompanying drawings, which illustrate the invention, like characters indicate like parts throughout the several views.

Referring to the drawings, Figure 1 is a side elevation of the improved loader and carrier, some parts being indicated in different positions by means of broken lines and some parts being sectioned; Fig. 2 is a plan view of the improved loader and carrier; Fig. 3 is a front elevation of the same; Fig. 4 is a detail view, partly in plan and partly in horizontal section, taken on the line $x^4$ $x^4$ of Fig. 3, on an enlarged scale; and Fig. 5 is a detail view, partly in elevation and partly in vertical section, taken on the line $x^5$ $x^5$ of Fig. 4.

The truck frame of the improved hay and grain loader and carrier is in the form of a heavy, horizontal push bar 1, the front end of which is in the form of a fork. As shown, this push bar 1 is preferably constructed from a pair of angle irons, having their vertical flanges turned inward and rigidly secured together by rivets, throughout its rear, or main, body portion. The fork of the push bar 1 is formed by first separating these angle bars, bending the same outward at right angles to form the transverse portion of the fork, and then bending the same forward at right angles into parallel arrangement with the body of said push bar to form the prongs of the fork.

The front or forked end of the push bar 1 is supported by a pair of axially alined wheels 2, loosely journaled on outwardly projecting trunnions 3, rigidly secured, one to each of the prongs of said push bar, slightly forward of the longitudinal centers thereof. The rear end portion of the push bar 1 is supported by a steering wheel 4, journaled between the prongs of a wheel bracket 5. An upwardly projecting steering post 6, rigidly secured to the wheel bracket 5, is journaled in a bearing bracket 7, rigidly secured to the rear end of the push pole 1. The upper end portion of the steering post 6 projects considerably above the bearing bracket 7 and has slidably mounted thereon a forwardly projecting seat bracket 8, to which is secured an operator's seat 9. By reference to Fig. 2, it will be noted that the upper end portion of the steering post 6 is square in cross section and fits a correspondingly formed seat in the hub of the seat bracket 8. By thus mounting the seat bracket 8 on the steering post 6 the same is secured against rotary movement thereon but free for vertical sliding movement. The seat 9 is secured in different vertical positions above the push bar 1 by means of a set screw 10, having screw-threaded engagement with the hub of the seat bracket 8 and impinging against the steering post 6.

Mounted on the push bar 1, directly under the seat 9, is an operator's platform 11. The machine is steered by an operator sitting on the seat 9 with his feet resting on the platform 11. Obviously, the operator, by throwing his weight to one side or the other of the machine, may oscillate the steering post 6, and hence the wheel 4, to guide the machine. On the periphery of the wheel 4 is formed a rib or flange 12 which cuts into the ground and prevents said wheel from sluing. Brace rods 13 secure the outer ends of the transverse portion of the fork of the push bar 1 to the main body portion of said push bar. A pair of whiffle trees 14, to which the draft animals are attached, is secured to an equalizer 15, pivoted to a keeper bracket 16, secured to the under side of the push bar 1, just forward of the bearing bracket 7. Neck yokes 17 for the draft animals are, as shown, attached to the transverse portion of the fork of the push bar 1. In some instances, it might be desirable to connect these neck yokes to the brace rods 13.

The movement of the improved hay and grain loader and carrier is controlled by a brake having shoes arranged to be set on the peripheries of the wheels 2 by the operator. As shown, these brakes are in the form of horizontally movable brake rods 18, having their forward ends bent laterally outward in front of the wheels 3 and equipped with brake shoes 19. The brake rods 18 are slidably mounted in bearing lugs 20, on the outer faces of the prongs of the push bar 1. Coiled springs 21, telescoped onto the brake rods and compressed between the rearmost of the bearing lugs 20 and abutments 22 on said brake rods, yieldingly hold the brake shoes 19 inoperative and out of engagement with the wheels 2. The operator may set the brakes, at will, by means of an intermediately fulcrumed lever 23, connected at its lower or short end to the rear ends of the brake rods 18 by means of flexible connections, such as cables 24. These cables 24 extend forward from the lever 23 through a depending eye 25 on the push bar 1, thence, in opposite directions over guide sheaves 26 on the rear end portions of the prongs of said push bar, to the eye-equipped rear ends of the brake rods 18, to which they are attached.

The brake-setting lever 23 is intermediately fulcrumed to a quadrant 27, rigidly secured to the push bar 1, just forward of the platform 11, where the same may be easily manipulated by the operator. Secured to the quadrant 27 is a ratchet bar 28, with the teeth of which the lever 23 engages to secure the same in different positions. The lever 23 has sufficient spring tension to yieldingly engage the teeth of the ratchet bar 28 to hold the same interlocked therewith but may be readily sprung out of engagement with said teeth when it is desired to move the lever.

Hung from the push bar 1, below the fork thereof, is a pick-up platform in the form of a substantially horizontal, forwardly projecting fork. This pick-up platform comprises a multiplicity of laterally spaced pick-up bars, or teeth 29, a rock shaft 30, laterally spaced side boards 31, and a spacing bar 32. The rear end portions of the pick-up teeth 29 are bent upwardly and rearwardly and their extreme rear ends are seated in and rigidly secured to the rock shaft 30. This rock shaft 30 extends transversely of the machine, substantially directly under the transverse portion of the fork of the push bar 1, and is loosely journaled in depending bearings 33, secured to said push bar. The rear upper edge portions of the side boards 31 are notched to receive the rock shaft 30 and are rigidly bolted to the outer end portions thereof. The forward, under edge portions of the side boards 31 are rounded so as to ride over an obstruction, such as a stone or stump. The spacing bar 32 is bolted to the under edges of the side boards 31, just rearward of the bends in the pick-up teeth 29, which are seated therein and held properly spaced with respect to each other.

The outer or free end portion of the pick-up platform is supported in different vertical positions by a lever 34 and flexible connections 35, such as cables. By these same connections, the pick-up platform is also tilted from a position to pick up hay, flax, or a shock of grain to a carrying position. One end of the lever 34 is in the form of a fork, the prongs of which embrace the prongs of the push bar 1 and are pivotally secured thereto at their free ends. This lever 34 projects upwardly and rearwardly into a position where the same may be easily manipulated by the operator. A hand-actuated spring latch 36 is mounted on the lever 34 for coöperation with a notched quadrant 37, secured to the push bar 1, to secure said lever in either of its extreme positions. The rear ends of the cables 35 are anchored to eyes 38 on the rear end portions of the prongs of the lever 34, extend upward over guide sheaves 39, journaled in standards 40, carried by the prongs of the push bar 1, and from the guide sheaves 39 extend downward under guide sheaves 41, also journaled in the standards 40. From the guide sheaves 41 the cables 35 extend forward over guide sheaves 42, journaled on the uprights of an arch bar 43, rigidly secured to the extreme outer end portions of the prongs of the push bar 1. Brace rods 43ª extend from the transverse portion of the arch bar 43 to the intermediate portion of the prongs of the push bar 1. The cables 35 from the guide sheaves 42 extend downward and are anchored to eyes 44, attached to the upper outer end portions of the side boards 31. When the lever 34 is in an upper position, as shown by full lines in Fig. 1, the pick-up platform is in a position to pick up hay, flax, or a shock of grain, but, when the said lever is moved downward into a dotted line position, said pick-up platform is tilted to a carrying position, as also indicated by dotted lines.

In bucking a load of hay, flax, or a shock of grain, the same is packed between the side boards 31 and the forked ends of the push bar 1 and lever 34, and is thereby held in position on the pick-up teeth 29. To prevent the load from falling forward, a vertically movable gate 45 is provided. This gate 45 includes a cross head 46, having antifriction roller-equipped bifurcated ends, the prongs of which embrace the uprights of the arch bar 43 and guide said cross head for vertical sliding movement transversely of the machine. To this cross head 46 is rigidly secured a multiplicity of depending tines or teeth 47.

The gate 45 is raised and lowered by the lever 34 simultaneously with the raising and lowering movements of the pick-up platform, but in reverse directions thereto. In other words, when the pick-up platform is lowered, the gate 45 is raised, and when the said pick-up platform is raised, the gate is lowered. A flexible connection 48, in the form of a cable, connects the lever 34 with the gate 45. The rear end of this cable 48 is anchored to a small clevis 49 on the free end portion of the lever 34, extends downward under a sheave 50, journaled on the quadrant 37, thence forwardly and upwardly over a guide sheave 51, journaled on the transverse portion of the arch bar 43 and thence downward and anchored to the cross head 46. By reference to Fig. 2, it will be noted that the free ends of the pick-up bars 29 are tapered in the form of vertical wedges so as to more easily cut through the hay, flax or grain at the time the same is picked up.

Operation: The pick-up platform is pushed ahead of the draft animals and the machine is steered by the operator in a manner previously described. In bucking a load of hay, flax, or a shock of grain, the pick-up platform and gate are set as indicated in full lines in Fig. 1. Under the advance movement of the machine, the pick-up teeth 29 pass through the butt ends of the sheaves of grain close to the ground. When the shock is completely embraced by the forked end portions of the push bar 1 and lever 34 and closely packed thereagainst the operator forces the lever 34 downward into a dotted line position, as shown in Fig. 1, thereby tilting the pick-up platform and raising the shock of grain from the ground, at the same time the gate 45 is lowered. The picking up of the shock of grain and lifting the same from the ground is all accomplished without stopping the advance movement of the machine. The load on the machine may be carried to a threshing machine, stack or barn. To remove the load from the machine, the same is deposited on the ground by lowering the pick-up platform, raising the gate, and then backing the machine away from the load. When the load is to be stacked, or lifted into a hayloft, the same may be dropped directly onto a hay sling, thus avoiding any pitching whatsoever. The gate 45 will prevent any of the hay or grain from dropping from the machine while the same is traveling with a load, thus preventing any waste whatsoever. By reference to Fig. 1 it will be noted that the pick-up fingers 29 are increased in thickness from their free ends toward their rear ends, thereby giving the same a form that will readily enter a shock of grain and at the same time having the necessary strength to support the load.

What I claim is:

1. The combination with a push bar, having a fork-like front end, of a pair of wheels journaled on the prongs of said push bar, an arch bar connecting the prongs of the push bar at their free ends, a steering wheel journaled on the rear end portion of said push bar, and a pick-up platform carried by and hung below the prongs of said push bar.

2. The combination with a push bar, having a fork-like front end, of a pair of wheels journaled on the prongs of said push bar, an arch bar connecting the prongs and the push bar at their free end portions, a steering wheel journaled on the rear end portion of the push bar, a pick-up platform fulcrumed to the push bar in the vicinity of its transverse portion, and connections between the arch bar and pick-up platform for raising and lowering the pick-up platform with respect to the push bar.

3. The combination with a wheel-supported push bar, having a fork-like front end, of a pick-up platform fulcrumed on said push bar for tilting movement below the prongs thereof, a platform-tilting lever having a forked end, the prongs of which are fulcrumed to the prongs of said push bar, and a connection between said lever and pick-up platform.

4. The combination with a wheel-supported push bar, having a fork-like front end, of a pick-up platform fulcrumed on said push bar for tilting movement below the prongs thereof, a platform-tilting lever having a forked end, the prongs of which are pivoted to the prongs of said push bar, a cable connection between said lever and pick-up platform, a gate mounted between the prongs of said push bar, and means for opening and closing said gate.

5. The combination with a wheel-supported push-bar, having a fork-like front end, of a pick-up platform fulcrumed on said push bar for tilting movement below the prongs thereof, a platform-tilting lever having a forked end, the prongs of which are pivoted to the prongs of said push bar, a cable connection between said lever and pick-up platform, a vertically movable gate mounted between the prongs of said push bar, and a cable connecting said gate to said lever for movements in reverse directions to the tilting movements of said platform.

6. The combination with a wheel-supported push bar, having a fork-like front end, of a pick-up platform fulcrumed on said push bar for tilting movement below the prongs thereof, a platform-tilting lever, having a forked end, the prongs of which are pivoted to the prongs of said push bar, a cable connection between said lever and pick-up platform, an arch bar secured at its ends to the prongs of said push bar, a vertically movable gate slidably mounted on the uprights of said arch bar, and a cable connecting said gate to said lever for movements in reverse directions to the tilting movements of said platform.

7. The combination with a wheel-supported push bar, having a fork-like front end, of a pick-up platform fulcrumed on said push bar for tilting movement below the prongs thereof, a platform-tilting lever having a forked end, the prongs of which are pivoted to the prongs of said push bar, a cable connection between said lever and pick-up platform, means for locking said lever in either of its extreme positions, an arch bar secured at its ends to the prongs of said push bar, a vertically movable gate slidably mounted on the uprights of said arch bar, and a cable connecting said gate to said lever for movements in reverse directions to the tilting movements of said platform.

8. The combination with a wheel-supported push bar, having a fork-like front end, of a pick-up platform fulcrumed on said push bar for tilting movement below the prongs thereof, a platform-tilting lever having a forked end, the prongs of which are pivoted to the prongs of said push bar, a cable connection between said lever and pick-up platform, an arch bar secured at its ends to the prongs of said push bar, a vertically movable cross head slidably mounted on the uprights of said arch bar, depending tines rigidly secured to said cross head and affording a gate, and a cable connecting said cross head to said lever for movements in reverse directions to the tilting movements of said platform.

In testimony whereof I affix my signature in presence of two witnesses.

ERLAND PAULSON.

Witnesses:
F. M. BREUDENRUHL,
HENRY SCHWARTZ.

Copies of this patent may be obtained for five cents each, by addressing the "Commissioner of Patents, Washington, D. C."